United States Patent Office 3,775,533
Patented Nov. 27, 1973

---

3,775,533
ACTINIDE COMPOUNDS WITH AMMONIA
OR CO AND H
Lubertus Bakker, Mentor, Ohio, assignor of a fractional part interest to Joseph P. Meyers, Palos Verdes, Calif.
No Drawing. Filed Aug. 27, 1971, Ser. No. 175,695
Int. Cl. C01g 43/00, 56/00
U.S. Cl. 423—253  13 Claims

ABSTRACT OF THE DISCLOSURE

This invention comprises new complex compounds of metals in the actinide series of the Periodic Table of the Elements with carbon monoxide, hydrogen and/or ammonia. These complexes are prepared by heating the metals with one or more of the gases for periods up to 24 hours at temperatures of 200° C. to 370° C. and pressures of 15 to 150 atmospheres. These complex compounds are useful for separating closely related metals from each other as well as separating different isotopes or changing isotope distribution of various metals in the subject series.

BACKGROUND OF THE INVENTION

The so-called rare earths among the chemical elements are divided into two groups or series. One series is generally identified as the actinide series and is usually considered to include the elements having atomic numbers from 89 up, the presently highest atomic number being 103 ascribed to lawrencium. The only actinide rare earths which occur in nature in addition to actinium are thorium, protactinium and uranium.

The principal elements of the actinide series are thorium and uranium. While actinium and protactinium occurs in nature they are found with uranium.

Thorium is a soft, radioactive metal which occurs in various minerals including monazite and thorite. When thorium is bombarded with neutrons, it changes to thorium-233, which decays to protactinium-233, which decays in turn to uranium-233, which is a nuclear fuel. Thorium also forms radioactive decay products, but these do not presently have any commercial importance.

Among the ores in which uranium is found the richest is pitchblende, and the most important in the United States is carnotite. However, it is well known that enormous quantities of uranium exist in shale and phosphate deposits, in granites and in the ocean, but this uranium has not heretofore been recoverable at reasonable cost.

Uranium ore goes from amines to uranium-concentrating plants where impurities (and other valuable minerals) are removed and the uranium is converted into $U_3O_8$. This uranium oxide is refined either to a pure metal powder which can be used in nuclear reactors for the production of plutonium or to the compound uranium hexafluoride $UF_6$, which can be vaporized and used in gaseous diffusion plants for the separation of isotopes all of which are radioactive. As found in nature, uranium consists of a mixture of three isotopes $U^{238}$, $U^{235}$ and $U^{234}$ in respective weight percentages of the order of 99.274, 0.72 and 0.006. Man-made uranium isotopes expand the group of isotopes to range from $U^{227}$ to $U^{240}$. Most of these isotopes are only fissionable with fast or high energy neutrons, but two of these isotopes, namely $U^{235}$ and $U^{233}$, are easily fissionable by slow or low energy neutrons.

In a breeder reactor, $U^{235}$, in a mixture of $U^{235}$ and $U^{238}$, produces energy and neutrons of which some are captured by the $U^{238}$ to form $U^{239}$, which decays stepwise to $Np^{239}$ and then to $Pu^{239}$, which is also an easily fissionable material, the amount of $Pu^{239}$ being equal (in an efficient reactor) to the amount of $U^{235}$ used up. The most plentiful natural uranium isotope which is easily fissionable with low energy neutrons is $U_{235}$. However, it is an economic necessity that the amount of $U^{235}$ in any isotope mixture to be used in a breeder reactor be higher than 0.72 weight percent as found in nature. For this reason there has been a constant search for ways to enrich uranium isotope mixtures in the amount of $U^{235}$.

Heretofore, isotope mixtures have been converted to uranium hexafluoride $UF_6$, usually from the aforementioned oxide $U_3O_8$. The $UF_6$ can be readily vaporized, and the lighter weight isotopic vapor, moving slightly faster than heavier weight isotopic vapor, passes more easily through a pervious membrane. Consequently, a mixture of uranium hexafluorides of both $U^{235}$ and $U^{238}$ will be slightly richer in $U^{235}$ after being permitted to diffuse through a membrane than before such diffusion. Repetition of this technique results in mixtures of increasing concentration or "richness" in $U^{235}$. However, unfortunately, many hundreds of such diffusion steps are necessary to accomplish any significant $U^{235}$ enrichment.

SUMMARY OF THE INVENTION

This invention comprises new complex compounds of metals in the actinide series of the common Periodic Table of the Elements. These compounds are stable or at equilibrium under proper temperature and pressure conditions, but they can be converted to other compounds or to the pure metal by properly altering the temperature and/or pressure.

These compounds are prepared by reacting one or more of the subject metals with carbon monoxide, hydrogen, ammonia and/or low molecular weight amines (identified below as $NR_3$), separately or in combination, under conditions of temperature and pressure and for a time sufficient to produce distinguishable products and, if desired, by subsequently separating the desired product or products. The temperatures and pressures employed are limited only by practical structural limitations and process considerations including critical vaporization temperatures and decomposition temperatures. Temperatures for the manufacture of other similar metal compounds have ranged from about —70° C. up to as high as 400° C., and absolute pressures have ranged from 10 to 500 atmospheres. Such conditions apply in the methods of preparation which are part of this invention, but the preferred temperature range is from about 200 C. to about 370° C., and the preferred range of absolute pressure is from about 15 to about 150 atmospheres, especially for the manufacture of the described compounds with metals of the actinide series, principally uranium. Similarly, the time for reaction can vary depending only on the amount of product desired and the rate of reaction under a given set of conditions. A period of from 16 to 24 hours has been found to be satisfactory to produce the subject compounds of uranium.

The complex compounds of this invention may be better understood by defining them by the formula

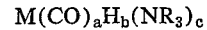

in which M can be any metal from the actinide series of the Periodic Table of the Elements, a, b and c can each be zero or an integer up to about 8, at least one of a, b and c being an integer and the relative values of a, b and c depending on the valence of M and the compound structure, and each R can be a hydrogen atom or any organic group which is stable under the conditions of reaction, each $NR_3$ having a maximum molecular weight of about 200.

In addition to providing new compounds and methods for their preparation, this invention is useful in making possible the separation of metals within the actinide series by the preparation of compounds which are more readily separable by known physical means than previously available compounds. Similarly, this invention is believed to provide a method for changing isotope proportions in a radiocative actinide metal compound as exemplified by the enrichment of uranium metal in the $U^{235}$ isotope while producing the uranium compounds of this invention.

DESCRIPTION OF THE PREFERRED EMBODIMENTS

The preferred embodiments of this invention are compounds of uranium and their preparation, particularly compounds of the isotopes of uranium found in nature, primarily $U^{235}$ and $U^{238}$.

For the preparation of the subject uranium compounds, the uranium is preferably employed as pure metal. Preferably, the starting uranium compound contains no more than about 1% of $U^{235}$ isotope and can contain as little as 0.03% or even less based on the total uranium present although greater percentages of $U^{235}$, e.g., 4% or more, will not adversely affect the system.

The other reactants are preferably ammonia or a combination of carbon monoxide and hydrogen. In place of ammonia suitable amines or amino compounds can be used, suitable amines and amino compounds including any amines which are stable under the conditions of reaction and which contain either no other functions or which contain functions which do not interfere with the desired reaction. The suitable amines and amino compounds should have molecular weights no greater than about 200. Such amines can contain more than one amine function.

The preferred temperature range is 400° F. to 550° F., more preferably about 450° F. to 500° F. The pressures employed are preferably in the range of 1000 to 1500 p.s.i.g. although both higher and lower pressures can be used as stated above.

The desired reaction appear to have a relatively short incubation period, e.g., an hour or two, during which a major portion of the reaction takes place, but further heating significantly improves yield. The time allowed for reaction is preferably about 16 hours although 24 hours or more can be used. However, it appears that continued heating of the rare earth metal hydrocarbonyl complexes of this invention produces decomposition to the respective carbonyl series by splitting out hydrogen although the time, temperature and pressure conditions for such decomposition vary from metal to metal. The degradation of the uranium hydrocarbonyl appears to be one if not the only method of producing uranium carbonyls.

These reactions can be carried out batchwise or as a continuous process. These reactions are preferably carried out in the dry state, but both aqueous systems and systems using suitable organic solvents can be employed.

The following examples are illustrative of the best presently known modes of practicing the subject invention and are not intended to limit this invention which is properly delineated in the appended claims.

EXAMPLE I

For each run of this example there was employed about 100 grams of uranium containing 0.72% by weight $U^{235}$ isotope and having an average particle size sufficient to pass through a 60 mesh screen (U.S. Sieve Series) with some fines as small as 200 mesh. The synthesis gas was an equimolar mixture of hydrogen and carbon monoxide. The runs were carried out according to a statistical two-level factorial design using temperatures of 450° F. (about 232° C.) and 500° F. (260° C.), pressures of 1000 p.s.i.g. and 1500 p.s.i.g. and times of 16 hours and 24 hours

TABLE I

| Run | Temp. (° F.) | Pressure (p.s.i.g.) | Time (hr.) |
|---|---|---|---|
| A | 450 | 1,000 | 16 |
| B | 500 | 1,000 | 16 |
| C | 450 | 1,500 | 16 |
| D | 500 | 1,500 | 16 |
| E | 450 | 1,000 | 24 |
| F | 500 | 1,000 | 24 |
| G | 450 | 1,500 | 24 |
| H | 500 | 1,500 | 24 |

For each run the uranium metal was placed in a two-gallon high pressure stainless steel reaction vessel, and synthesis gas was introduced at the desired pressure. The system was heated to the desired temperature and maintained at that temperature and the desired pressure for the desired time. The unreacted synthesis gas was then vented, but it can easily be recycled. In each case there was a fluffy, soft, solid product having a relatively weak structure, having a density in the range of about one-third to one-fourth of the density of uranium and having excellent resistance to concentrated nitric acid, which readily dissolves uranium. Because of the up to four-fold increase in molecular size of the product over the uranium starting material, the product can be readily separated from unreacted uranium by a centrifuge or a sieve of such dimension that the unreacted uranium will pass through but the product will be retained. In this example the product was separated from unreacted uranium by a 60 mesh sieve. Heat decomposition of the products at 950° F. (510° C.) at atmospheric pressure produced $UO_2$ and gas which on quantitative analysis showed, based on gas-liquid phase chromatography coupled with X-ray diffraction studies, that each of the products had the formula $UH_2(CO)_8$.

From the test data several equations have been derived which conform to the data and which show the effect of variation of any two variables on efficiency of the method and for predicting productivity for a given set of conditions.

For a reaction time of 16 hours, percent conversion to the product produced and identified above $= 114.2 + 1.75X + 1.20Y - 0.85XY$ where X is [temp. (°F.) $-475$]/25 and Y is [press. (p.s.i.g.) $-1250$]/250.

For a reaction time of 16 hours, percent of solids increasing in size over 60 mesh $= 7.9 - X - 1.10Y + 2.25XY$ where X and Y are as defined above.

At a temperature of 450° F., percent conversion $= 113.6 + 3.15Y + 1.15Z + 1.10YZ$ where Y is as defined above and Z is [time (hr.) $-20$]/4.

At a temperature of 450° F., percent of solids increasing over 60 mesh $= 7.75 - 3.25Y - 3.1Z$ where Y and Z are as defined above.

The uranium starting material converted to $UO_2$ and the $UO_2$ produced by heat decomposition of the greater than 60 mesh products of Runs A, C, E and G of this example were analyzed for both alpha and gamma radiation using a radiation detector accurate to 1%, the radiation being measured in counts per one-half gram per minute.

TABLE II

| Run | Radiation | | |
|---|---|---|---|
| | Alpha | Gamma | Total |
| Starting material | 5,918 | 4,103 | 10,021 |
| A | 6,049 | 4,539 | 10,588 |
| C | 6,327 | 4,399 | 10,636 |
| E | 6,697 | 4,436 | 11,133 |
| G | 6,669 | 4,439 | 11,008 |

I believe that the explanation for the increase in radiation is that the method of this invention under the conditions employed produces a reaction with higher selectively toward the $U^{235}$ isotope. Based on the fact that the radiation of U²³⁵ is 1.07363 times that of U²³⁸ the increase in radiation of these products over the radiation of the starting material corresponds to mean increase in the weight percentage of U²³⁵ isotope of 7.59%.

A further equation has been hypothesized from this data. Based on total radiation, at a temperature of 450° F., percent enrichment in $$U^{235} \text{ isotope} = 7.59 - 0.17Y + 2.11Z - 0.41YZ$$

where Y and Z are as defined above. Based only on gamma radiation, the equation is:

$$\text{percent enrichment} = 7.4 - 1.3Y + 1.3YZ$$

or $7.4 + 1.3Y(Z-1)$. Based only on alpha radiation the equation is $$\text{percent enrichment} = 8.1 + 0.9Y + 3.9Z - 1.25YZ$$

From the above runs an analyses, I have concluded that when uranium containing 0.72 percent U²³⁵ isotope is reacted with an equimolar mixture of carbon monoxide and hydrogen at temperatures between 450° F. and 500° F. and gauge pressures between 1000 and 1500 p.s.i. for periods of 16 to 24 hours, the resulting product has a mean increase or enrichment of the U²³⁵ isotope of the order of 8%. Thus, converting the uranium hydrocarbonyl product to metal and repeating the cycle about 20 to 25 times produces a uranium product containing about 3.5 to 5 weight percent U²³⁵ isotope based on the uranium product, and about 36 cycles produces products containing as high as 10 weight percent U²³⁵ isotope based on the total uranium. It also appears that the enrichment may be increased by varying the reaction parameters, but as percent conversion approaches 100, the isotope balance in the product approaches the isotope balance in the starting material.

This has also been found to be true with uranium having 0.05% with U²³⁵ isotope.

EXAMPLE II

Uranium like that employed in Example I was reacted with ammonia at 500° F. and a gauge pressure of 300 p.s.i. for 16 hours producing a product enriched about 8 weight percent in U²³⁵ and according to chemical analysis by gas-liquid phase chromatography coupled with X-ray diffraction studies having the formula $U(NH_3)_8$. This product was a medium brown pyrophoric solid at room temperature, insoluble in water, and had a density of about 4 grams/cc. at room temperature and pressure.

The runs of Examples I and II can readily be performed using mixtures of carbon monoxide and ammonia or mixtures of carbon monoxide, hydrogen and ammonia for the synthesis gas mixture employed in Example I or the ammonia in Example II. Similar runs can also be made using thorium instead of uranium as a starting material and producing thorium products richer in one isotope than the starting material.

The novel compounds of this invention are useful in that compounds of related metals within the actinide series or compounds of isotopic metals can be more readily separated than the metals or isotopes in previously known forms or combinations. These compounds can also be readily decomposed by heat to produce the respective pure metal or any desired compound of the respective metal. The methods of this invention are useful in the preparation of the compounds of this invention and are especially useful with radioactive materials, particularly uranium, in that in the reaction process the reaction is selective in favor of one isotope making possible the isolation of a product which is richer in a particular isotope than the starting material and leaving a leached residue which is leaner in the same isotope than the starting material. This is of particular importance in the production of readily fissionable material from both natural actinide metal sources and from radioactive wastes.

What is claimed is:
1. Complex compounds of the formula

$$M(CO)_a H_b (NH_3)_c$$

in which M is a metal of the actinide series of the Periodic Table of the Elements and each of $a$, $b$ and $c$ is a whole number ranging from 0 to 8, such that when $c$ is 0, $b$ is greater than 0 and $a$ is equal to or greater than $b$ and when $c$ is greater than 0, both $a$ and $b$ are 0.

2. A compound in accordance with claim 1 wherein M is uranium or thorium.

3. A compound in accordance witth claim 2 wherein M is uranium, $a$ is 8, $b$ is 2 and $c$ is 0.

4. A compound in accordance with claim 2 wherein M is uranium, $a$ is 0, $b$ is 0 and $c$ is 8.

5. A method consisting essentially of heating metal of the actinide series of the Periodic Table of the Elements with a substituent selected from the group consisting of ammonia and a mixture of carbon monoxide and hydrogen at a temperature and pressure and for a time sufficient to form a complex compound having a density of no more than 10 grams per cubic centimeter.

6. A method in accordance with claim 5 wherein the temperature is in range of about 200° C. to 370° C. and the pressure is in the range of about 15 to 150 atmospheres.

7. A method in accordance with claim 6 wherein the metal is uranium.

8. A method in accordance with claim 7 wherein the uranium contains no more than one percent by weight of the U²³⁵ isotope.

9. A method in accordance with claim 8 wherein said substituent is a mixture of carbon monoxide and hydrogen, the temperature is in the range of about 400° F. to 550° F., the pressure is in the range of 1000 to 1500 p.s.i.g. and the time is no more than about 24 hours.

10. A method in accordance with claim 8 wherein said substituent is ammonia, the temperature is in the range of 400° F. to 550° F., the pressure is in the range of 200 to 1500 p.s.i.g. and the time is no more than about 24 hours.

11. A method in accordance with claim 8 wherein the complex product contains about 0.08 times as much U²³⁵ as in the starting metal.

12. A method in accordance with claim 5 wherein after the heating step the complex product is separated from any unreacted metal.

13. A method consisting essentially of
  (1) heating uranium metal containing no more than one percent by weight of U²³⁵ isotope with a substituent selected from the group consisting of ammonia and mixtures of carbon monoxide and hydrogen at a temperature in the range of about 400° F. to about 550° F. at a pressure in the range of about 200 to 1500 p.s.i.g. for from 16 to 24 hours,
  (2) separating the resulting complex compounds product from any residual starting material,
  (3) decomposing said complex compound product to uranium metal containing a higher proportion of U²³⁵ isotope than the uranium starting material, and
  (4) repeating steps (1,), (2) and (3) with said enriched metal as desired to form a product containing up to 10 percent by weight U²³⁵ isotope based on the total uranium present, the last decomposition step being to the desired uranium compound.

References Cited
UNITED STATES PATENTS

| | | | |
|---|---|---|---|
| 2,558,377 | 6/1951 | Perlman et al. | 23—348 |
| 2,793,106 | 5/1957 | Jazwinski et al. | 23—203 C |
| 3,383,184 | 5/1968 | Kloepfer et al. | 23—348 X |

LELAND A. SEBASTIAN, Primary Examiner

U.S. Cl. X.R.

260—429.1; 423—249, 250, 251, 252, 255